March 3, 1931. C. W. FRICK 1,795,207
VOLTAGE SUPPLY MEANS
Filed March 16, 1929
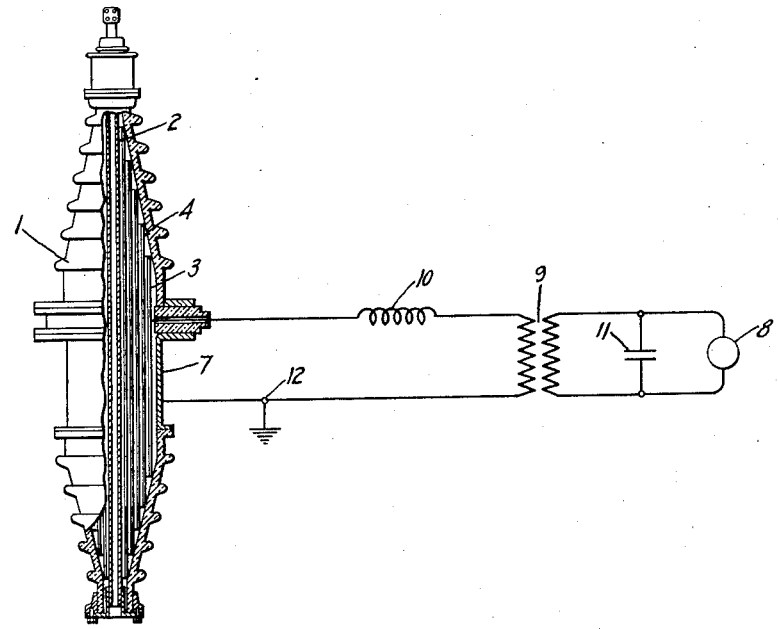
Inventor:
Charles W. Frick,
by *Charles E. Tullar*
His Attorney.

Patented Mar. 3, 1931

1,795,207

UNITED STATES PATENT OFFICE

CHARLES W. FRICK, OF SCHENECTADY, NEW YORK, ASSIGNOR TO GENERAL ELECTRIC COMPANY, A CORPORATION OF NEW YORK

VOLTAGE-SUPPLY MEANS

Application filed March 16, 1929. Serial No. 347,681.

My invention relates to means for use particularly in connection with the measurement of high voltages, and to means for supplying electromotive forces from high voltage sources to devices such as synchronoscopes, measuring instruments, relays and the like through capacitance means such as bushings of the oil-filled type having suitable conducting sheaths.

One of the objects of my invention is to provide means whereby a greater amount of energy is obtained from the bushing for operation of the measuring instrument or relay than has been obtained heretofore. Another object of the invention is to provide means for use in connection with a bushing of the type indicated whereby accurate measurement of the voltage of the source, or indications thereof having allowable error, may be effected by means of instruments having a broader range of impedance characteristics than have been employed heretofore. Still another object of the invention is to provide means whereby improved phase relation between the voltage of the source and that on the instrument may be obtained.

The novel features which I believe to be characteristic of my invention are set forth with particularity in the appended claims. My invention itself, however, may best be understood by reference to the following description taken in connection with the accompanying drawing in which the single figure represents an embodiment of my invention.

Referring to the accompanying drawing in which I have diagrammatically illustrated an embodiment of my invention, I have represented at 1 a bushing which may be of any well-known construction through which passes a conductor 2. This conductor may be employed, for example, to connect any suitable apparatus to one of the high tension conductors of a power distribution system. Within the bushing I have indicated concentric metallic cylindrical sheaths 3 and 4 etc., which extend coaxially with the conductor 2 and which are insulated from each other by oil or other insulating material according to well-known practice. This bushing may be supported from the case of the desired apparatus, which may comprise a transformer, oil circuit breaker, or the like, to which conductor 2 leads, by any suitable means arranged about and engaging the metallic outer portion 7 of the bushing.

At 8 is indicated an instrument which may be a synchronoscope, volt-meter, or the like. This instrument is connected through a network comprising transformer 9 and capacity 11 to a suitable sheath of the bushing. One side of the primary winding of the transformer is connected, as shown, through an inductance 10 to a conductor which leads through a suitably insulated tap on the bushing to any desired one of the sheaths as, for example, the outer sheath 3. The other side of the primary of the transformer is connected to ground. This ground, of course, will usually comprise the metallic transformer, or oil circuit breaker, case having portions which engage the metallic portion 7 of the bushing. The inductance 10 which, in accordance with my invention, is connected in the primary circuit of the transformer and the capacity 11 will have suitable values presently to be indicated.

It will of course be apparent from an examination of the drawing that a certain capacity exists between the sheath 3 of the bushing and the metallic portion 7 thereof which is connected to ground or point of reference potential of the system to which conductor 2 is connected. Similarly a capacity exists between the sheath 3 and the conductor 2. The potential upon the sheath 3 will thus be dependent upon the ratio of these capacities.

I have found that by giving the inductance 10 a value such that its reactance at the frequency of the voltage of the conductor 2 is equal to the reactance of the capacities existing between the sheath 3 and conductor 2 and between the sheath 3 and ground, these capacities being considered as connected in parallel, the ratio between the voltage impressed on the conductor 2 to that impressed on the primary of the transformer 9 will be sufficiently independent of the impedance of the network as measured across the primary of the transformer with the instrument connected across the output circuit to permit indications to be had having a certain allowable error by the use of instruments having a considerably broader range of impedances than has been possible heretofore. The above described arrangement possesses the further advantage that the ratio of voltage on the line to that on the instrument is substantially unaffected by the excitation characteristics of the transformer.

The above condition can best be understood from the following equation which readily results from a computation of the value of current flowing in the primary of the transformer 9

$$I = \frac{j\omega C_1 E}{1 + j\omega Z(C_1+C_2) + j\omega Z'(C_1+C_2)}$$

where I represents the current in the primary of the transformer; E represents the voltage on conductor 2 with respect to ground; $C_1$ the capacity between the sheath 3 and the line 2; $C_2$ the capacity between the sheath 3 and ground; $Z'$ the impedance of the network as measured across the primary of the transformer; Z the impedance of the inductance 10; $\omega$ the frequency of the impressed voltage multiplied by $2\pi$, and $j$ the imaginary quantity $$\sqrt{-1}.$$

The equation for I as above given may be derived as follows: Let $Z'$ as previously stated represent the impedance of the network as measured across the primary of transformer 9. This will be the resultant impedance of instrument 8, condenser 11 and transformer 9, both primary and secondary. Z represents the impedance of the inductance 10. Let $Z_3$ represent the impedance of the network as measured across condenser plate 3 and ground. This will include the impedance of $$C_2 = -j\frac{1}{\omega C_2}$$

and $(Z+Z')$ in parallel. Thus:

$$Z_3 = \frac{1}{\frac{1}{Z+Z'} + \frac{1}{-j\frac{1}{\omega C_2}}} = \frac{1}{\frac{1}{Z+Z'} + \frac{\omega C_2}{-j}}$$

$$= \frac{-j(Z+Z')}{\omega C_2(Z+Z') - j} \quad (1)$$

Let $Z_2$ represent the total impedance of the condenser bushing and network as measured between line 2 and ground. $Z_2$ = the impedance of $$C_1 + Z_3 = -j\frac{1}{\omega C_1} + Z_3$$

Substituting the value of $Z_3$ from Equation (1)

$$Z_2 = \frac{-j(Z+Z')}{\omega C_2(Z+Z') - j} + \left(-j\frac{1}{\omega C_1}\right)$$

Since $j=$ $$\sqrt{-1}$$

the expression $$\left(-j\frac{1}{\omega C_1}\right)$$

may be written $$\frac{-j}{\omega C_1}$$

and thus $$Z_2 = \frac{-j(Z+Z')}{\omega C_2(Z+Z') - j} - \frac{j}{\omega C_1} \quad (2)$$

If we apply a voltage of frequency $\omega$ across the condenser bushing, i. e., between 2 and ground, a current $I_2$ will flow through $C_1$.

$$I_2 = \frac{E}{Z_2}$$

Substituting the value of $Z_2$ from (2)

$$I_2 = \frac{E\omega C_1[\omega C_2(Z+Z') - j]}{-j\omega C_1(Z+Z') - j\omega C_2(Z+Z') - 1} \quad (3)$$

The voltage from 3 to ground may be represented by $E_3$ and is equal to $I_2 Z_3$ multiplying the values of $I_2$ and $Z_3$ as given in Equations (2) and (3)

$$E_3 = \frac{jE\omega C_1 Z_3}{j\omega C_1 Z_3 + j\omega C_2 Z_3 + 1} \quad (4)$$

The current I through 10 and the primary of transformer 9 equals $$\frac{E_3}{Z+Z'}.$$

Substituting the value of $E_3$ given in Equation (4) we thus obtain $$I = \frac{j\omega C_1 E}{1 + j\omega Z(C_1+C_2) + j\omega Z'(C_1+C_2)}$$

It will be seen from this equation that if the quantity $1 + j\omega Z(C_1+C_2)$ be made equal to zero that the following relation will result $$\frac{IZ'}{E} = \frac{C_1}{C_1+C_2}$$

Since then $IZ'$ represents the primary voltage of the transformer it will be seen that this voltage bears a ratio to the voltage of the line which is independent of the impedance of the network measured as stated above, and hence is independent of the excitation characteristics of the transformer and the impedance of the connected secondary burden including the instrument. Since to obtain this condition the quantity $1 + j\omega Z(C_1+C_2)$ must equal zero it will be seen that Z should equal $$\frac{1}{-j\omega(C_1+C_2)}$$

or, in other words, if resistance be neglected, the reactance of the coil 10 should equal the reactance of the two capacities $C_1$ and $C_2$ considered as connected in parallel.

While the above condition represents that of resonance with respect to the inductance 10 and the capacities as described, it will be apparent that with the circuit as actually employed a condition of resonance will not be had due to other elements of the circuit including the transformer 9, capacitance 11 and the instrument 8. It may be found that with a suitable transformer 9 and an instrument 8 of any commercial construction commonly employed for these purposes that resonance of the circuit, all elements considered, will occur at a frequency differing from the line frequency by a minimum of thirty per cent and generally by a greater amount. It has been found, however, that considerably more energy is available for operating the instrument than it has been practicable to obtain heretofore by use of measuring circuits employing capacitance transformers, as indicated, and, further, that indications of voltage having an allowable range of error may be had by instruments having a broader range of impedances than has heretofore been possible. The transformer 9 may also be of cheaper construction.

A further advantage resulting from the use of the reactance 10 in the primary circuit of the transformer and proportioned as indicated resides in the fact that the phase relation between the line potential and that on the primary of the transformer is more nearly independent of the instrument impedance, and also independent of the excitation characteristics of the transformer. By virtue of the proportioning of the reactance 10 with reference to the capacities in the manner indicated the phase difference between the voltage on the transformer and that on the line will be materially decreased.

For the purpose of protecting the bushing against excessive voltages due to excessive burdens upon the transformer 9 the condenser 11 is connected to the secondary winding of the transformer. It will be apparent that if the impedance of the transformer with a given load connected to the secondary, is reactive that the potential on the primary thereof will be in aiding relation to that on the reactance 10. If the burden becomes sufficiently great, as might be the case were a very low impedance instrument connected to the secondary winding, or if a plurality of secondary windings be employed and an instrument be connected to each winding, these aiding potentials may be sufficiently great to endanger the bushing. This is particularly true when the instrument connected to the transformer has highly inductive reactance. This difficulty may be reduced, however, by use of condenser 11 connected in parallel with the load having capacity such that the inductive effect of the load, and the current in reactor 10 and hence the voltage on this reactor are maintained at values such that the bushing is not endangered, so long as the instrument employed is one having impedance such that indications having allowable error are obtainable. If the instrument impedance be pure resistance or slightly inductive, this capacitance may render the total load somewhat capacitive in which case the voltage on the primary of the transformer will oppose that on the reactor 10. To protect the bushing against very low impedance loads, or short circuits, on the secondary of the transformer, any suitable protective equipment such as a spark gap connected between the bushing tap and ground may be employed.

While in the drawing I have indicated a particular type of bushing it will of course be understood that the construction of the bushing comprises no part of my invention and that any of the well-known forms having one or more sheaths, as indicated, may be used or, if desired, suitably insulated condensers of ordinary construction connected between the line and ground may be employed as well.

What I claim as new and desire to secure by Letters Patent of the United States is:

1. In combination, a source of alternating electromotive force, a plurality of condensers connected in series across said source, an inductance, a network having an input circuit and an output circuit including a voltage responsive device, the input circuit of said network and said inductance being connected in series across one portion of said condensers and the reactance of said inductance at the frequency of said electromotive force being equal to the reactance of the two portions of said condensers considered as connected in parallel.

2. In combination, a source of alternating electromotive force, a plurality of condensers connected across said source, a transformer having a primary winding and a secondary winding, an inductance, said primary winding and said inductance being connected in series across one of said condensers, a load connected to said secondary winding, said inductance having a value such that the effective electromotive force on said primary winding is substantially independent of the impedance of said load, and a condenser connected in parallel with said load.

3. In combination, a conductor having high voltage impressed thereon, a conducting member located between said conductor and ground, a transformer having a primary winding connected between said member and ground and a secondary winding, a measuring device connected to said secondary winding, an inductance connected in series with said primary winding having reactance equal to the reactance of the sum of the capacities existing between said member and conductor and between said member and ground whereby the ratio of the voltage on said conductor to that on said measuring device is substantially unaffected by the excitation characteritsics of said transformer.

4. In combination, a source of electromotive force, a plurality of condensers connected between said source and ground, a transformer having a primary winding and a secondary winding, said primary winding being connected between ground and a point intermediate certain of said condensers, a voltage responsive instrument connected to said secondary winding, and means connected in the primary circuit of said transformer for decreasing the phase difference between the voltage on the primary of said transformer and that of said source.

In witness whereof, I have hereunto set my hand this 15th day of March, 1929.

CHARLES W. FRICK.